United States Patent Office 3,511,412
Patented May 12, 1970

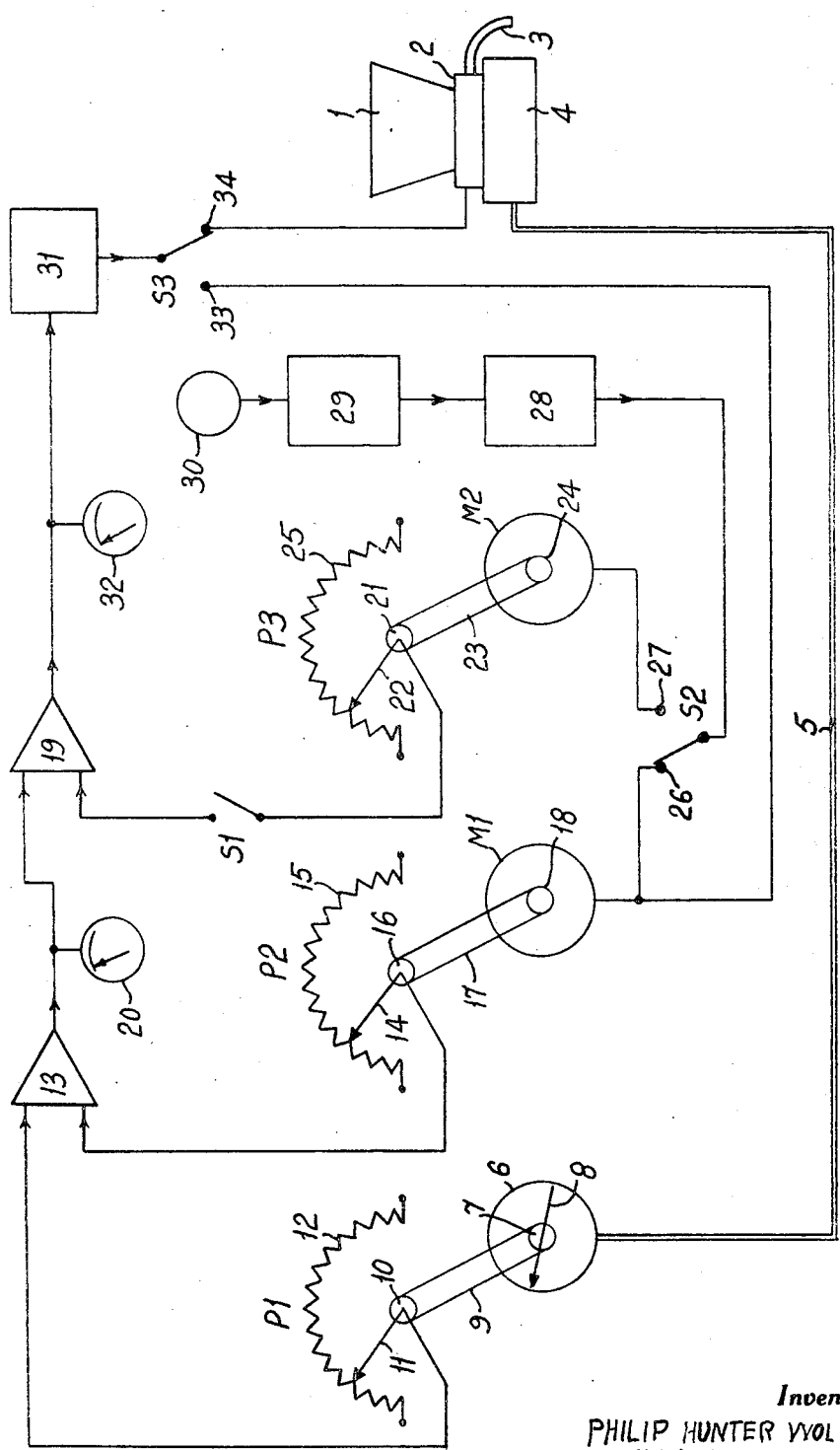

3,511,412
APPARATUS FOR DISCHARGING PARTICULATE MATERIAL
Philip H. Wolfenden, Coventry, and Michael J. Hare, Balsall Common, England, assignors to Courtaulds Limited, London, England, a British company
Filed Jan. 16, 1968, Ser. No. 698,331
Claims priority, application France, Jan. 17, 1967, 2,392/67
Int. Cl. B67d 5/08; G01g 19/22
U.S. Cl. 222—58
5 Claims

ABSTRACT OF THE DISCLOSURE

Particulate material discharging apparatus comprising a discharger driven by a driving mechanism for discharging the material from a hopper, a weighing machine for continuously weighing the material in the hopper, means responsive to the weighing machine for producing a first potential proportional to the weight of material in the hopper, a generator for generating a second potential which varies at a controlled rate according to the desired discharge rate, a comparator for comparing said potentials and for emitting a third potential when the first and second potentials are unequal, and a controller, actuated by the third potential, for controlling said driving mechanism so that the first and second potentials tend to become equal.

---

This invention is concerned with apparatus for discharging particulate material and in particular with such apparatus the rate of discharge of which is controllable. The term "particulate material" is used hereinafter to include powders and granulated materials, and other materials, for example slurries, the rate of discharge of which cannot be controlled by conventional liquid flow-control devices.

According to this invention an apparatus for discharging particulate material comprises a hopper for containing the material, a discharger for discharging the material from the hopper, a driving mechanism for the discharger, a weighing machine for continuously weighing the material in the hopper, means responsive to the weighing machine for producing a first electrical signal of potential proportional to the weight of material in the hopper, a generator for generating a second electrical signal of which the potential varies at a controlled rate according to the desired rate of discharge, a comparator for comparing the potentials of the first and second electrical signals and for emitting a third electrical signal when those potentials are unequal, and a controller, actuated by the third electrical signal, for controlling the operation of the driving mechanism of the discharger so that the first and second electrical signals tend to become of equal potential.

Hitherto, one type of apparatus for discharging particulate material at a controlled rate has been operated by continuously weighing the hopper and its contents on a weighing device having a counter-balance threaded on an arm and automatically movable along the arm at a predetermined rate according to the desired discharge rate. When the hopper's weight gets out of step with its predicted weight, according to the position of the counter-balance on the arm, the movement of the beam of the weighing device causes the operation of a switch adjacent to it. The switch is connected to control the rate of discharge from the hopper so as to tend to return the beam to its balanced position. This apparatus is insensitive and its use has to be interrupted each time the hopper needs to be re-filled.

The apparatus of the present invention can be made to operate extremely sensitively, for example with a maximum weighing error of as little as ±0.1 percent of the hopper's weight, or even less. Moreover, the operation of the apparatus can be controlled to take into account the periods whilst the hopper is being re-filled, and thus can effectively be operated continuously.

The discharger may incorporate a vibrator and may, for example, be simply a vibrated chute beneath the hopper. However, other types of discharger can be used, for example, a screw-feeder. Normally the hopper and the discharger are both weighed, together with the contents of the hopper, the only variable weight being of course, that of the contents.

The means for producing the first electrical signal may conveniently be a potentiometer, either the wiper or the coil of which is mounted on a part of the apparatus which moves as the weight of the hopper varies, the part of the potentiometer not so connected being stationary. With a uniform potential drop along the coil, the potential on the wiper is proportional to the weight of the contents of the hopper. Where the hopper and the discharger are located in a flame-proof area, the potentiometer may be remote from the weighing machine and connected to it by a non-electrical link, for example, pneumatically.

The generator for generating the second electrical signal may also comprise a potentiometer, in which case either the coil or the wiper may be moved in relation to the other by a motor so that the potential on the wiper varies. The motor can be run at a constant predetermined rate, if desired, or at a controlled rate which varies according to the demand for the particulate material. For example, if the particulate material is to be mixed with a liquid in a predetermined ratio, then the liquid can be metered by a flowmeter which emits an electrical signal having some property, such as pulse rate, which is proportional to the liquid flow rate. If it is a pulsed signal, then the ratio of liquid to particulate material can be adjusted by modifying the signal using a digital ratio setter which extracts a desired proportion of the pulses from the signal. This modified signal, after conversion to a suitable form, if necessary, can be used to control the output speed of the motor which drives the potentiometer, so that the potential of the second electrical signal varies according to the flow rate of the liquid.

The comparator may be the standard type of electrical comparator and its output signal may be amplified if necessary. The controller which is actuated by this output signal from the comparator may be simply a relay switch in the circuit of a driving mechanism for the discharger. For example, the vibrator for a chute discharger may come into operation when the relay switch is actuated by a signal from the comparator. With a screw-feed type of discharger, the actuation of the relay switch may cause the drive motor for the screw to come into operation.

The apparatus may also include a memory device for adjusting the potential of the second electrical signal during the period when the hopper is being refilled and no material is being discharged to a value which, after refilling is complete and discharging is recommenced, will cause the discharger to discharge the amount of material which otherwise, but for refilling, would have been discharged during the refilling period in addition to its continuing discharge.

The memory device may comprise a first switch for disconnecting the output of the controller from the discharger and connecting it to control the drive of the potentiometer which comprises the generator, a second switch which is closable to connect the wiper arm of a memory potentiometer to a second input of the summing amplifier, said memory poentiometer comprising said wiper arm and a coil connected to a supply of electric current of stabilised voltage and giving a uniform potential drop along its length, and a drive for producing relative movement of the coil and the wiper arm of the memory potentiometer at a controlled rate so that a fourth electrical signal is applied from the wiper arm to the second input of the summing amplifier, the potential of said signal being of opposite polarity to that of the third electrical signal applied to the first input from the comparator and proportional to the weight of material which otherwise, but for refilling, would have been discharged.

One embodiment of apparatus in accordance with the invention will now be described, by way of example, with reference to the accompanying drawing, the single figure of which is a schematic diagram of the apparatus.

In the apparatus shown in the drawing, a powder hopper 1 is mounted above a vibrator feeder 2 having an outlet 3, both of which are supported on a weighing machine 4. The weighing machine measures the weight of the hopper and of its contents and of the vibrator feeder and generates a pneumatic pressure, which is proportional to the weight of the contents, in a pneumatic line 5 which is connected between the machine and a diaphragm-operated dial 6. The dial has a spindle 7 on which a pointer 8 is mounted and which is connected by a mechanical linkage 9 for transmitting rotary motion to a spindle 10 bearing the wiper 11 of a rotary potentiometer P1. The ends of the coil 12 of the potentiometer are connected to stabilised voltage sources (not shown) so that the coil has a fixed voltage drop along its length.

The wiper 11 is electrically connected to one input of a comparator 13, the other input of which is connected to the wiper 14 of a second rotary potentiometer P2. The comparator 13 is basically a proprietary unit which operates so as to produce a signal at its output when the potentials applied to its inputs are unequal. In practice the comparator is arranged to generate a signal when the difference between the potentials applied to its inputs exceeds a predetermined small value, to avoid instability due to over sensitivity.

The ends of the coil 15 of the potentiometer P2 are connected to the same stabilised voltage sources as those of the potentiometer P1. A wiper 14 is mounted on a spindle 16 which is connected by a mechanical linkage 17 to the spindle 18 of a motor M1, for transmitting rotary motion therefrom.

The output of the comparator 13 is connected to one input of a summing amplifier 19 and to a voltmeter 20. The other input of the summing amplifier is connected to the fixed contact of a switch S1, the moving contact of which is connected to a spindle 21 bearing the wiper 22 of a third rotary potentiometer P3. The spindle 21 is connected by a mechanical linkage 23 to the spindle 24 of a second motor M2, for transmitting rotary motion therefrom. The ends of the coil 25 of the potentiometer P3 are connected to the same stabilized voltage sources (not shown) as those of the coils of the potentiometers P1 and P2.

The motors M1 and M2 are electrically connected to the fixed contacts 26 and 27 respectively of a two-way switch S2. The moving contact of the switch is connected to the output of a pulse unit 28, the input of which is connected to the output of a digital ratio setter 29. The input of the ratio setter is derived from a flow meter 30. The flow meter 30 produces electrical pulses at a frequency proportional to the flow rate of a liquid with which the powder is to be mixed. The mixing ratio of the powder to the liquid is predetermined by the manual setting of the digital ratio setter 29 which operates by removing from the signal received from the flow meter 30 a proportion of the pulses which is variable between 0 and 100 percent. The pulse unit 28 receives the pulsed signal from the ratio setter 29 and produces from that signal a further pulsed signal which is suitable for controlling the rotation of the motors M1 and M2.

The output of the amplifier 19 is connected to a detector unit 31 and also to a voltmeter 32. The output of the detector unit 31 is connected to the moving contact of a second two-way switch S3, the fixed contacts 33 and 34 of which are connected, respectively, to the motor M1 and to the vibrator feeder 2.

During normal running of the apparatus, that is between the times when the hopper 1 is re-filled with powder, the moving contacts of the switches S1, S2 and S3 are positioned as shown in the drawing. As explained above, the demand for the powder is indicated in the signal produced by the flow meter 30 which results in a signal being fed from the pulse unit 28 to the motor M1. This causes the motor to rotate at a rate which is controlled by the flow rate of liquid past the flow meter 30. Through the mechanical linkage 17 connecting the wiper 14 to the motor M1, the wiper is progressively traversed along the coil 15 so that a signal (which is the second electrical signal referred to above) having a changing potential derived from the wiper 14 is received by an input of the comparator 13.

When the potentials applied to the inputs of the comparator are unequal, a signal (which is the third electrical signal referred to above) is produced at its output which is fed to one input of the summing amplifier 19. The amplifier amplifies the sum of the potentials applied to its inputs, although with the switches positioned as shown there will be no potential applied to its second input. The signal produced by the amplifier 19 is fed to the detector unit 31 which produces from that signal a pulsed signal which is fed through the switch S3 to the vibrator feeder 2. Thus, when the potentials applied to the inputs of the comparator 13 are unequal, the vibrator feeder 2 is caused to operate so as to discharge some of the powder from the hopper 1.

As the weight of the contents of the hopper decreases, the weighing machine 4 causes the pressure within the pneumatic link 5 to alter. This causes the spindle 7 of the dial 6 to turn the pointer 8, which gives a visual indication of the weight of the powder remaining in the hopper, and also causes the wiper 11, connected to the spindle 7 by the linkage 9, to move along the coil 12. This produces a varying potential in the signal (which is the first electrical signal referred to above) applied to the first input of the comparator 13 from the wiper 11. This varying potential is arranged to become equal to that fed to the second input of the comparator from the wiper 14 the amount of powder discharged from the hopper is equal to the desired amount discharged, as indicated by the positions of the wiper 14 along the coil 15, which in turn is controlled by the signal from the flow meter 30, as modified by the ratio setter 29. When the potentials become equal the vibrator feeder is stopped from discharging powder from the hopper until the potential of the signal from the wiper 14 changes.

Thus, the apparatus operates during its normal running so as to discharge the powder from the hopper at a rate which is accurately controllable according to the demand for the particulate material.

When the hopper 1 is to be re-filled with powder the operator of the apparatus changes the positions of the switches S1, S2 and S3, which may for this purpose be connected together for simultaneous operation, to the positions opposite to those shown in the drawing. This causes the motor M2 and the potentiometer P3 to be brought into use by their connection between the pulse unit 28 and the amplifier 19. At the same time the detector unit 31 is disconnected from the vibrator feeder and is connected to the motor M1.

Thus, when the fresh powder is supplied to the hopper 1, and its weight is thereby increased rapidly, the resultant pressure change through the pneumatic link 5 causes the wiper 11 to be moved back towards its starting position. This causes a signal having a changed potential to be applied to the comparator 13 and the resultant imbalance between the potentials at the inputs of the comparator causes a signal to be applied to the amplifier 19 and thus through the detector unit 31 and the switch S3 to the motor M1. The signal applied to the motor is such as to cause the wiper 14 connected to the motor to move along the potentiometer coil 15 towards its starting position, in step with the return of the wiper 11 in the potentiometer P1 so as to tend to equate the signals applied to the comparator 13. The motor M1 may be disconnected from the spindle 16 and replaced by an auxiliary motor, or the motor M1 may be connected to the spindle through a gear-box, to enable the return of the wiper 14 at a faster speed than its normal traversing speed along the coil.

Whilst the hopper 1 is being re-filled, the vibrator feeder 2 is disconnected by the switch S3 from the detector unit 31 and no powder is discharged from the hopper. However, during this period the flow meter 30 continues to produce the signal indicating the demand for the particulate material. This signal is now fed through the ratio setter 29 and the pulse unit 28 to the motor M2, which drives the wiper 22 of the potentiometer P3 along the coil 25 so as to produce on the wiper a signal (which is the fourth electrical signal referred to above) of potential which is proportional to the weight of the powder which should be discharged from the hopper 1 during the re-filling period if the vibrator feeder were in use. The potential on the wiper 22 is fed through the switch S1 to the amplifier 19 in which it is added to the potential of the signal from the comparator 13. The amplified signal is then fed to the detector unit 31 from which a further signal is fed to the motor M1. This causes the potentials fed to the inputs of the comparator to be unequal and a signal is then generated and applied to the input of the amplifier 19. By arranging the potentials applied to the amplifier to be of opposite polarity the circuit becomes stabilized, by the time the hopper has been re-filled, with the potential on the wiper 14 equal to that on the wiper 22, which, as explained above, is proportional to the amount of powder which should have been discharged from the hopper during the re-filling period.

When the switches S1, S2 and S3 are returned to the positions shown in the drawing, on completion of the re-filling operation, the motor M2 and the potentiometer P3 are taken out of circuit and the detector unit 31 is re-connected to the vibrator feeder. The potentials now applied to the amplifier 19 do not now cancel out so that a signal is produced in the amplifier which, through the detector unit, causes the vibrator feeder to commence to discharge powder from the hopper. The powder discharging continues until the potentials of the signals fed to the comparator 13 are equalized, which occurs when the amount of powder discharged equals the amount which should have been discharged during the re-filling period. With the flow meter 30 re-connected through the ratio setter 29 and the pulse unit 28 to the motor M1, the apparatus continues to operate normally after the initial discharge of powder. As the time taken to refill the hopper 1 is generally only minutes whereas the time taken to discharge the contents of a full hopper may be several hours, the operation of the apparatus is substantially continuous.

During the periods of normal running, the wiper 22 is re-set to its starting position by rotation of the motor M2, which may be connected to an auxiliary motor or to a gear-box for this purpose.

It will be apparent that the voltmeter 20 and 32 play no part in the actual operation of the apparatus and can therefore be omitted. However, they do fulfil a useful function in providing a continuous indication of the performance of the apparatus, the voltmeter 20 giving a "coarse" indication and the voltmeter 32 a "fine" indication of the amount by which the actual weight of powder discharged from the hopper is behind that desired according to the signals from the flow meter 30. In the event of a breakdown in the apparatus, the readings of the voltmeter give an indication to the operator of the apparatus how must powder should be manually added to the vessel into which the powder from the hopper is fed.

It will also be apparent that, where the hopper 1 is not located in a flame-proof area, the potentiometer P1 may be connected directly to the weighing machine 4. It is still, however, advantageous to connect the dial 6 to the potentiometer as this gives a reading of the actual weight of powder in the hopper.

Whilst the apparatus has been described with the motors M1 and M2 controlled by pulsed signals, it will be appreciated that they could readily be controlled by direct current signals, although this form of control might perhaps be less accurate.

We claim:
1. Apparatus for discharging particulate material comprising:
  (a) a hopper for containing the material;
  (b) a chute for discharging the material from the hopper;
  (c) a vibrator for the chute;
  (d) a weighing machine for continuously weighing the material in the hopper;
  (e) means for producing a first electrical signal of potential proportional to the weight of material in the hopper said means comprising a potentiometer comprising a coil which gives a uniform potential drop along its length and a wiper arm, a supply of electric current of stabilized voltage connected to said coil, either the coil or the wiper arm being attached to the weighing machine so that movement of the weighing machine because of a change of weight of the material in the hopper causes relative movement between the coil and the wiper arm which results in the potentiometer producing in the wiper arm said first electrical signal;
  (f) a generator for generating a second electrical signal of which the potential varies at a controlled rate according to the desired rate of discharge said generator comprising a potentiometer comprising a coil which gives a uniform potential drop along its length and a wiper arm, a supply of electric current of stabilized voltage connected to said coil, and an electric motor for producing relative movement of the coil and the wiper arm;
  (g) a flow meter for metering a liquid with which the discharged material is to be mixed, the flow meter generating an electrical signal which is proportional to the liquid flow rate and which is applied to said electric motor to control its output speed and make it proportional to the liquid flow rate;
  (h) a comparator for comparing the potentials of the first and second electrical signals and for emitting a third electrical signal when those potentials are unequal; and
  (i) a controller, actuated by the third electrical signal, for controlling the operation of the chute vibrator so that the first and second electrical signals tend to become of equal potential.
2. Apparatus as claimed in claim 1 in which the electrical signal generated by the flow meter is a pulsed signal and including:
  (j) a digital ratio setter for exracting a selectable proportion of the pulses of the signals received from the flow meter and for passing on the modified signal to the electric motor.
3. Apparatus as claimed in claim 1 including:
  (k) a summing amplifier for amplifying the third electrical signal and having two inputs; and
    (l) a memory device which comprises a first switch for disconnecting the output of the controller from the discharger and connecting it to control the drive of the potentiometer which comprises the generator, a memory potentiometer comprising a coil which gives a uniform potential drop along its length and a wiper arm, a supply of electric current of stabilized voltage connected to said coil, an electric motor for producing relative movement of the coil and the wiper arm at a controlled rate so that a fourth electrical signal is produced on the wiper arm, a second switch which is closable to connect the wiper arm to an input of the summing amplifier, and a third switch for disconnecting the flow meter from the electric motor drive of the generator potentiometer and connecting it to the electric motor drive of the memory potentiometer, the potential of said fourth electrical signal being of opposite polarity to that of the third electrical signal which is applied to the other input of the amplifier from the comparator and proportional to the weight of material which otherwise, but for refilling, would have been discharged from the hopper.

4. Apparatus for discharging particulate material comprising a hopper for containing the material, a discharger for discharging the material from the hopper, a driving mechanism for the discharger, a weighing machine for continuously weighing the material in the hopper, means responsive to the weighing machine for producing a first electrical signal of potential proportional to the weight of material in the hopper, a generator for generating a second electrical signal of which the potential varies at a controlled rate according to the desired rate of discharge, a comparator for comparing the potentials of the first and second electrical signals and for emitting a third electrical signal when those potentials are unequal, a summing amplifier for amplifying the third electrical signal, and a controller, actuated by the amplified signal, for controlling the operation of the driving mechanisms of the discharger so that the first and second electrical signals tend to become of equal potential, including a memory device for adjusting the potential of the second electrical signal during the period when the hopper is being refilled and no material is being discharged, to a value which, after refilling is complete and discharging is recommenced, will cause the discharger to discharge the amount of material which otherwise, but for refilling, would have been discharged during the refilling period in addition to its continuing discharge, in which: the means for producing the first electrical signal comprises a potentiometer comprising a coil which gives a uniform potential drop along its length and a wiper arm, a supply of electric current of stabilized voltage connected to said coil, either the coil or the wiper arm being attached to the weighing machine so that movement of the weighing machine because of a change of weight of the material in the hopper causes relative movement between the coil and the wiper arm which results in the potentiometer producing in the wiper arm said first electrical signal of potential proportional to the weight of material in the hopper; the generator comprises a potentiometer comprising a coil which gives a uniform potential drop along its length and a wiper arm, a supply of electric current of stabilized voltage connected to said coil, and a drive for producing relative movement of the coil and the wiper arm at a controlled rate so that the potential of said second electrical signal generated in the wiper arm is varied at a controlled rate; the memory device comprises a first switch for disconnecting the output of the controller from the discharger and connecting it to control the drive of the potentiometer which comprises the generator, a memory potentiometer comprising a coil which gives a uniform potential drop along its length and a wiper arm, a supply of electric current of stabilized voltage connected to said coil, a drive for producing relative movement of the coil and the wiper arm at a controlled rate so that a fourth electrical signal is produced on the wiper arm, and a second switch which is closable to connect the wiper arm to a second input of the summing amplifier, the potential of said fourth electrical signal being of opposite polarity to that of the third electrical signal which is applied to the other input of the amplifier from the comparator and proportional to the weight of material which otherwise, but for refilling, would have been discharged.

5. Apparatus as claimed in claim 4 in which the drives of the generator potentiometer and the memory potentiometer both comprise electric motors and including a flowmeter for metering a liquid with which the discharged material is to be mixed, the flowmeter generating an electrical signal which varies in proportion to the liquid flow rate, and a third switch for disconnecting the flowmeter from the electric motor drive of the generator potentiometer and connecting it to the electric motor drive of the memory potentiometer whereby the output speed of the latter motor is controlled by the flowmeter and made proportional to the liquid flow rate.

References Cited

UNITED STATES PATENTS

| | | | |
|---|---|---|---|
| 3,329,311 | 7/1967 | Goff et al. | 222—58 X |
| 3,329,313 | 7/1967 | Mayer | 222—58 |
| 2,650,057 | 8/1953 | Goland et al. | 222—58 X |
| 3,099,368 | 7/1963 | Turner et al. | 222—58 |

STEPHEN J. TOMSKY, Primary Examiner

G. H. MILLER, JR., Assistant Examiner

U.S. Cl. X.R.

177—70, 108; 222—76